United States Patent [19]

Spellman

[11] Patent Number: 5,443,924
[45] Date of Patent: Aug. 22, 1995

[54] DISCRIMINATING CHARGER AND COMPATIBLE BATTERY

[75] Inventor: Patrick J. Spellman, Middleton, Wis.

[73] Assignee: Rayovac Corporation, Madison, Wis.

[21] Appl. No.: 968,337

[22] Filed: Oct. 29, 1992

[51] Int. Cl.⁶ .................. H02J 7/00; H01M 10/46
[52] U.S. Cl. ................................ 429/65; 429/167
[58] Field of Search ........................ 429/65, 167

[56] References Cited

U.S. PATENT DOCUMENTS

| | | | |
|---|---|---|---|
| 1,117,006 | 11/1914 | Doran | 429/121 |
| 2,988,588 | 6/1961 | Hartwig | 136/135 |
| 3,930,889 | 1/1976 | Ruggiero et al. | 136/166 |
| 3,967,979 | 7/1976 | Kaye | 136/173 |
| 4,403,182 | 9/1983 | Yeh | 320/2 |
| 4,468,439 | 8/1984 | Ohara et al. | 429/1 |
| 4,489,268 | 12/1984 | Beachy | 320/2 |
| 4,602,202 | 7/1986 | Mundschenk et al. | 320/2 |
| 4,608,528 | 8/1986 | Stillwell | 320/2 |
| 4,628,242 | 12/1986 | Scholefield | 320/2 |
| 4,628,243 | 12/1986 | Hudgman et al. | 320/2 |
| 4,645,996 | 2/1987 | Toops | 320/2 |
| 4,816,735 | 3/1989 | Cook et al. | 320/2 |
| 5,038,093 | 8/1991 | Edwards et al. | 320/2 |
| 5,108,847 | 4/1992 | Edwards et al. | 429/7 |
| 5,108,852 | 4/1992 | Tomantschger et al. | 429/66 |

OTHER PUBLICATIONS

American National Standard C18.1-1986, pp. 8-9, 47, 55, 61 and 63.

*Primary Examiner*—Mukund J. Shah
*Assistant Examiner*—Matthew V. Grumbling
*Attorney, Agent, or Firm*—Thomas F. Woods; David R. J. Stiennon

[57] ABSTRACT

A charger for a rechargeable alkaline manganese (RAM) battery has a positive contact which engages against the positive terminal of a compatible battery without making electrical contact with the positive terminal protruding nubbin. A rechargeable battery has an insulating jacket which surrounds the battery side wall but which does not overlap the positive terminal. Hence the charger positive contact may engage against the specially adapted battery and electrical contact, but will not make electrical contact with a conventional battery having a partially insulated positive terminal. Alternatively, the battery positive terminal may be insulated within less than 0.040 inches of the battery perimeter and be charged by protruding positive contacts spaced inwardly from the perimeter by approximately the same amount.

14 Claims, 3 Drawing Sheets

DISCRIMINATING CHARGER AND COMPATIBLE BATTERY

FIELD OF THE INVENTION

The present invention relates to rechargeable batteries and chargers in general, and to chargers configured to conduct current through only rechargeable batteries in particular.

BACKGROUND OF THE INVENTION

For greater convenience and portability many modern electrical appliances and consumer products may be operated to draw power from dry cells (commonly referred to as "batteries") of standard size and electrical performance. For convenience and economy various batteries have been developed which may be recharged for re-use. A number of chargers, operating off household current, have been developed to charge these rechargeable batteries. However, due to differences in chemistry, nonrechargeable batteries such as carbon-zinc or alkaline batteries may leak, discharge gases, or in some cases rupture, if subjected to a recharging current. Thus, for safety purposes, battery chargers must be provided with means for discriminating between batteries which may be safely recharged therein, and those which may not. Certain known chargers prevent battery charging accidents by providing the chargers with electrical circuits capable of distinguishing between batteries which should or should not be charged. Other known chargers provide the rechargeable batteries with non-standard structure such as specialized cathode or anode terminals which will only fit in and be charged by compatible battery chargers. Distinguishing electrical circuits within chargers are undesirable due to their added cost. Specialized anode or cathode structures require non-standard manufacturing capabilities and likewise add to battery cost.

What is needed is a charger which will recharge only compatible batteries and a compatible battery which may be manufactured at low cost.

SUMMARY OF THE INVENTION

The present invention provides a battery which is manufactured with minor changes to available assembly lines, and a battery charger that simply ensures safe operation by making electrical contact only with compatible batteries. The battery charger of the present invention has a positive contact which is shaped to make contact only with the outer peripheral regions of a battery positive terminal. The compatible battery is provided with a positive terminal which has electrically conductive material exposed on the outer periphery. As all conventionally available batteries have insulative material in this region, such conventional batteries, when placed within the charger of this invention, will not make electrical contact and hence will not be charged.

It is an object of the present invention to provide a battery charger which will charge only batteries particularly configured for that charger.

It is a further object of the present invention to provide a rechargeable battery of standard dimensions which may be employed in conventional electrical devices but which is adapted to be charged in a specialized charger.

It is another object of the present invention to provide a battery charger which will charge different sizes of batteries of desired type but which will not make electrical contact with batteries of an undesired type.

Further objects, features and advantages of the invention will become apparent from the following detailed description when taken in conjunction with the accompanying drawing.

DESCRIPTION OF THE PREFERRED EMBODIMENTS

Figure 1:
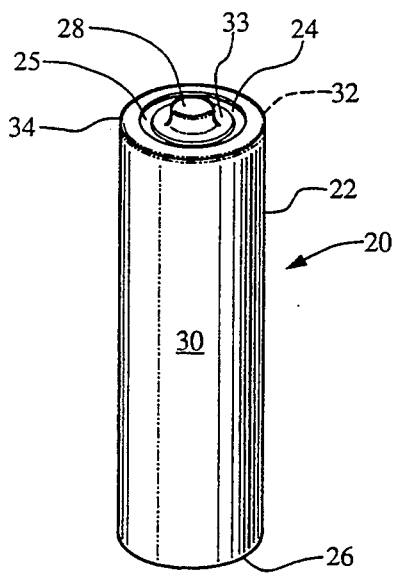
FIG. 1 is an isometric view of a prior art battery.

Referring more particularly to FIGS. 1-9, wherein like numbers refer to similar parts, a conventional battery 20, typical of those in the prior art is shown in FIG. 1. The prior art battery 20 has a cylindrical case 22 with a positive terminal 24 at one end and a negative terminal 26 at the other end. The positive terminal 24 has an annular planar base 25 with a ridge 33 and a nubbin 28 protruding therefrom. The nubbin 28 is adapted to engage against the negative terminal of an adjacent battery or the positive contact of an energy using device. An electrically insulative jacket or label 30 surrounds the case 22 and extends over a portion of the positive terminal 24 and extends inwardly from the positive terminal outer perimeter 32. The width of the positive terminal insulation overlap portion 34 was measured within a group of 10 batteries of each model for a number of battery models produced by various manufacturers. The positive terminal insulation overlap is measured from the exterior of the battery to the radial inward extension of the insulation material. The minimum and maximum positive terminal overlap for the label insulation is shown in Table 1.

TABLE 1

Battery Insulation Overlap of Positive Terminal

| Type | Manufacturer | Model | minimum (inches) | maximum (inches) |
| --- | --- | --- | --- | --- |
| AAA-Alkaline primary | RAYOVAC | 824 | 0.0530 | 0.091 |
| AAA-Alkaline primary | DURACELL | MN2400 | 0.0550 | 0.0735 |
| AAA-Alkaline primary | EVEREADY | E92 | 0.044 | 0.071 |
| AAA-Alkaline primary | KODAK | K3A-P | 0.0475 | 0.063 |
| AAA-NiCAD | Millennium | BAAA | 0.0535 | 0.920 |
| AAA-NiCAD | GE | Rechargeable GE3A | 0.0655 | 0.0790 |
| AAA-NiCAD | RAYOVAC | 624 | 0.0560 | 0.0915 |
| AA-Alkaline primary | RAYOVAC | 815 | 0.0625 | 0.1100 |
| AA-Alkaline primary | DURACELL | MN1500 | 0.0455 | 0.1005 |
| AA-Alkaline primary | EVEREADY | E91 | 0.072 | 0.099 |
| AA-Alkaline primary | KODAK | KAA-P | 0.052 | 0.0730 |
| AA-NiCAD | Millennium | BAA | 0.0810 | 0.1380 |
| AA-NiCAD | RAYOVAC | 615 | 0.0590 | 0.0950 |
| AA-NiCAD | SANYO | N600AA | 0.083 | 0.1105 |
| AA-NiCAD | EVEREADY | CH15 | 0.0755 | 0.1185 |
| AA-NiCAD | PANASONIC | P-3R | 0.0665 | 0.0940 |
| AA-NiCAD | GE | GC1 | 0.1010 | 0.1210 |
| Heavy-Duty | RAYOVAC | 5AA | 0.0825 | 01140 |
| C/Z primary | EVEREADY | 1215 | 0.052 | 0.0630 |
| AAA-NiCAD | EVEREADY | CH12 | N/A* | |
| AAA-NiCAD | PANASONIC | Rechargeable P-4R | N/A* | |

*entire positive terminal insulated except for nubbin

Batteries are available for consumer use in a number of standardized units which have dimension ranges specified by American National Standards. These standard battery sizes are designated by letters, for example D, C, AA, and AAA. The standard sizes are specified in American National Standard C18.1-1986, at 20-04 13-1752 (AAA); 20-0571-1988 (AA); 20-1031-1969 (C); and 20-1346-2421 (D), the disclosure of which is incorporated by reference herein.

Figure 2:
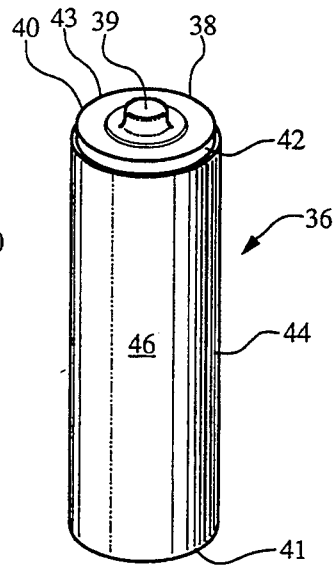
FIG. 2 is an isometric view of the rechargeable battery of this invention.

The battery 36 of the present invention, shown in FIG. 2, has a positive cathode terminal 38 with an annular planar base 43 and a ridge and nubbin 39 which protrude therefrom. The positive terminal has a circular outer perimeter 40 where the positive terminal planar base 43 intersects with the cylindrical side wall 42 of the battery case 44. The perimeter 40 defines the outer extremities of the positive terminal end 38 of the battery 36. A negative anode terminal 46 is located at the opposite end of the battery from the positive terminal 38. The anode terminal is connected to the battery case in electrically insulative relation to the cathode terminal. The battery 36 has an electrically insulative jacket or label 46 which is wrapped around the cylindrical side wall 42 of the battery case 44. The insulative label 46 is preferably formed of a nonconductive material such as plastic. The insulative label 46 has an upper edge 48 which terminates at a position along the side wall 42 beneath the positive terminal perimeter 40. The battery 36 thus has a positive terminal which is not covered by the label 46 and hence not insulated from frontward electrical contact. The planar base 43 of the positive terminal is exposed above the insulative jacket 46 for engagement by the positive contact of a battery charger.

Figure 6:
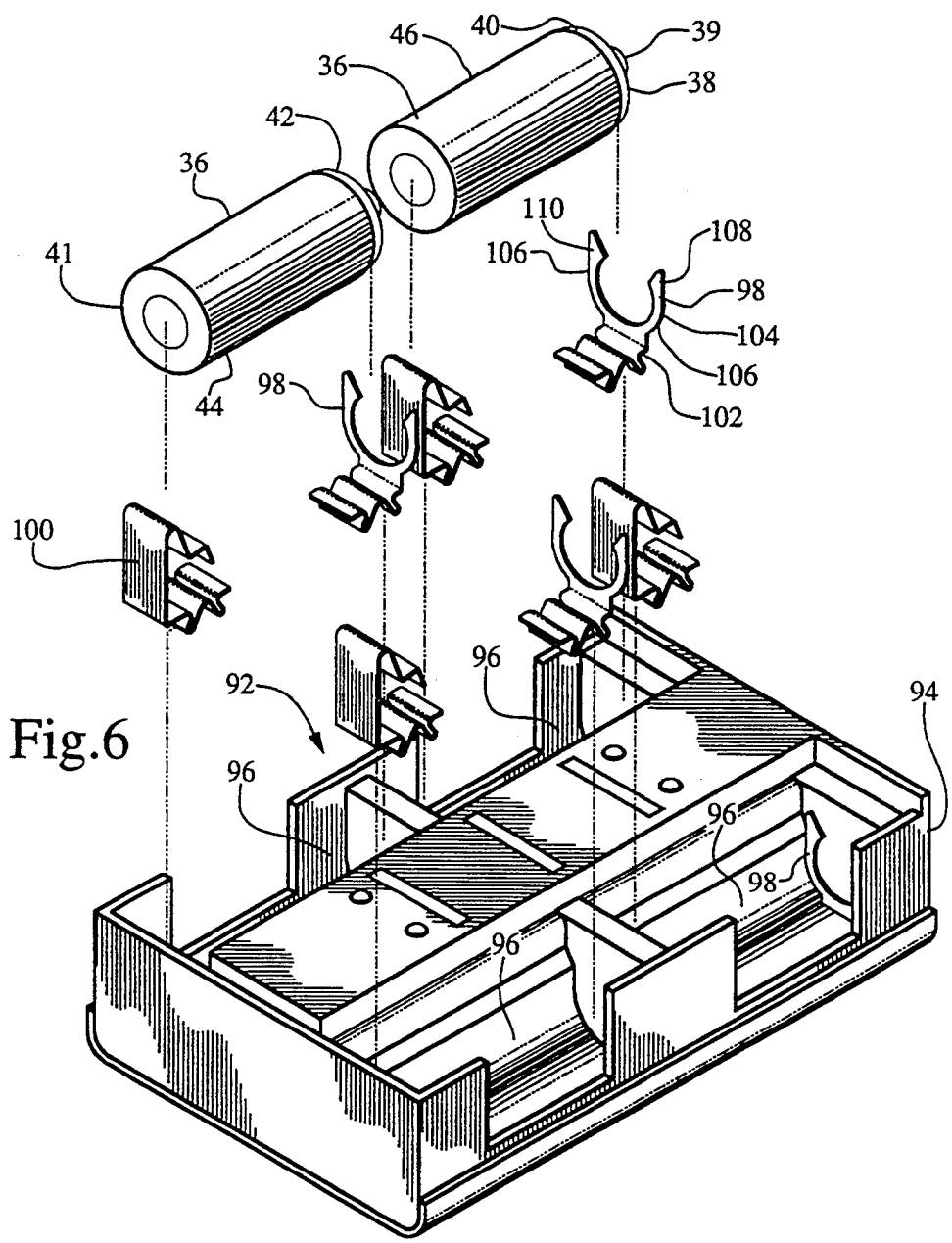
FIG. 6 is an exploded isometric view of a battery charger of the present invention.
Figure 7:
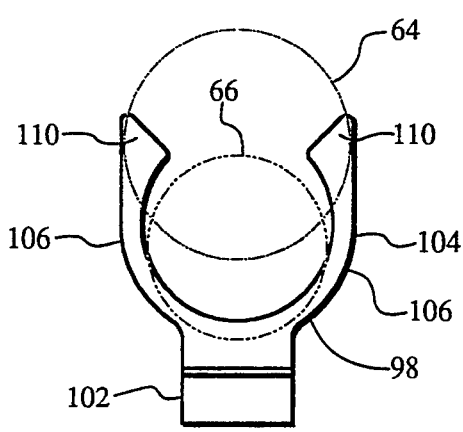
FIG. 7 is a schematic view showing the regions of electrical contact of the battery charger of FIG. 6 for a standard dimensioned AAA and AA battery.

The battery 36 is particularly adapted to be utilized in a specialized battery charger 92, shown in FIG. 6. The battery charger 92 has positive contacts 98 which are configured to make electrical contact only with batteries 36 having an uninsulated positive terminal base 43. Batteries with positive terminal insulation will not be charged.

Batteries of standard size and different chemistries may be interchangeably positioned in an energy using device. However, different types of batteries may require different charging equipment, or in the case of primary batteries, may not be rechargeable at all.

In the preferred embodiment the battery 36 is a rechargeable alkaline manganese (RAM) battery, such as that disclosed in U.S. Pat. No. 5,108,852, to a MANGANESE DIOXIDE CATHODE FOR A RECHARGEABLE ALKALINE CELL, AND CELL CONTAINING THE SAME, the disclosure of which is incorporated by reference herein. Said patent discloses a battery in which the cathodes are essentially unconstrained-that is, no cage is used in the cell between the cathodes and the anodes. The cathode is restricted from significantly changing its dimensions during discharge of the cell, when it is inclined to swell—as opposed to the tendency of the cathode to contract during a charge cycle. The cathode substantially fills the entire space allotted for it within the cell, with a slight accommodation for height-wise or longitudinal expansion or growth of the cathode of bobbin-type cells or crosswise expansion or growth of button-type cells. There may be additives in the cathode mix, including particularly conductive fibers of graphite or other conductive materials; and other materials may also be added to the cathode mix, including metallic additives. A preferred rechargeable alkaline cell would consist of a cathode composed of mostly manganese dioxide and graphite and an anode consisting usually of 50–70 percent zinc powder. The charger 92 will make electrical contact only with the battery 36 and avoids the hazards of recharging a primary or unsuitable secondary battery therein.

When providing a rechargeable alkaline battery, the battery structure of the present invention is particularly advantageously employed. As common alkaline batteries are typically nonrechargeable primaries there is a danger that an uninformed consumer may attempt to recharge a prior art alkaline battery in a charger adapted for rechargeable alkaline batteries. The charger and battery of the present invention work together to prevent current from being supplied to a nonrechargeable alkaline battery and to protect the safety of the consumer.

The battery 36 is advantageously manufactured at low cost on conventional battery assembly lines. The battery case and terminal configuration is unchanged from a conventional battery. Only the placement of the insulative label 46 is modified from that of a conventional battery to obtain the advantages of this invention.

The charger 92, shown in FIG. 6, is configured for charging of AA and AAA batteries only. The charger 92 has a plastic housing 94 and battery supports 96. A positive contact 98 and negative contact 100 are positioned adjacent each battery support 96 to engage against the positive terminal 38 and negative terminal 41 respectively of a battery 36.

The positive contact 98 is a thin platelike planar member having a base 102 which is electrically connected to the charger current source and a generally annular sector 104 with two upwardly extending arms 106. The arms 106 are narrow adjacent to the base 102 to engage in electrical contact with the outer perimeter of the positive terminal 38 of an AAA battery. The arms 106 are of increasing width as they extend upwardly. The widened portions 110 provide greater contact area with an AA battery supported by the housing 94 in a position elevated above the position of a supported AAA battery, as shown schematically in FIG. 7.

The charger 92 battery supports 96 serve to support a battery in the correct position for charging. Although a charger may be provided for any particular battery size, a preferred charger 92 is adapted to accommodate multiple battery sizes, for example, an AA cell, and an AAA cell. A positive contact 98 is positioned adjacent each support 58 so as to engage against a battery placed thereon. Negative contacts 100 are positioned on the side of the battery support 58 opposite the positive contacts 98. The negative contacts 100 are spring-loaded so as to retain a battery 36 engaged between the positive and negative contacts whatever the length of the battery.

The arms 106 extend upwardly from a base 102 which is in electrical connection with the charger electronics (not shown) which are conventional and which serve to convert A.C. current into a D.C. voltage and current which is appropriate for charging the batteries. The charger 50 has an appropriate charging circuit (not shown) adapted to be energized to provide electrical energy to a battery.

Figure 4:
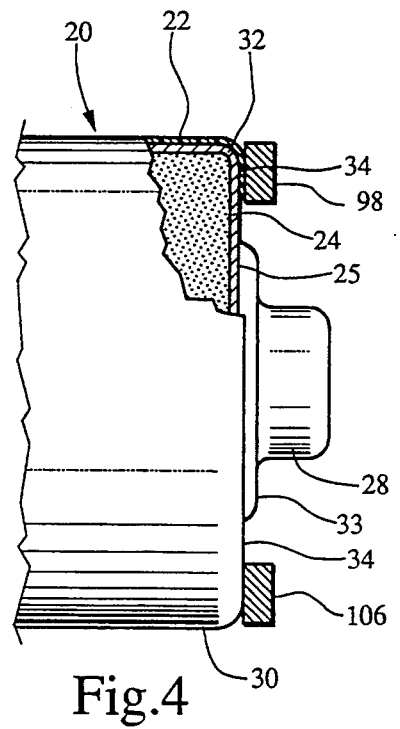
FIG. 4 is a side elevational view, partially broken away, of the prior art battery of FIG. 1 in nonelectrical engagement with the contacts of the battery charger of the present invention.
Figure 5:
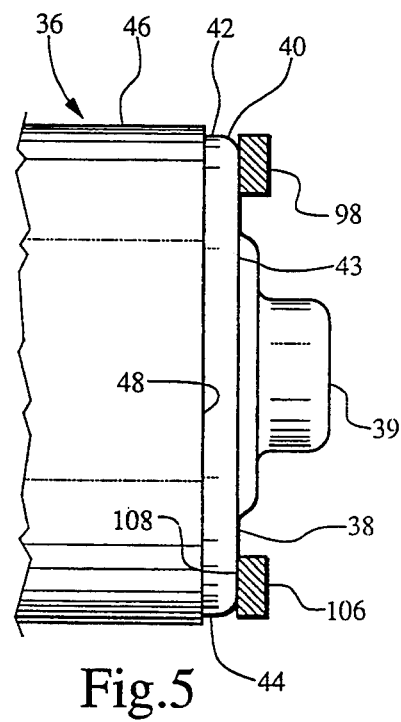
FIG. 5 is a side elevational view of the battery of FIG. 2 in electrical engagement with the positive contact of the battery charger of the present invention.

The battery supports 96 position each battery such that the positive terminal 38 planar base engages against the positive contact 98 to form an electrical connection, yet does not engage against the battery protruding nubbin 39. Should a prior art battery 20 be inserted within the charger 92, as shown in FIG. 4, the nubbin 28 will extend between the arms 106 of the positive contact 98 and the positive terminal 24 of the prior art battery 20. As the insulation overlap portion 34 prevents electrical contact between the positive terminal 24 and the battery charger contact 98, no current will flow to the inappropriate battery and no damage will result.

As shown in FIGS. 1 and 4, conventional batteries are provided with a protruding annular ridge 33 positioned intermediate between the positive terminal outer perimeter 32 and the nubbin 28. The ridge 33 protrudes above the level of the positive terminal planar base 25 and, in many conventional batteries, protrudes above the insulation overlap portion 34. The positive contacts 98 of the battery charger 92 are thus configured such that the positive contact planar face 108 may engage against the annular planar base 43 of a battery 36, but will in no case engage against the ridge 33 of a conventional battery 20. If the positive contact were allowed to engage the annular ridge 33 of a conventional battery, electrical contact would be made and current would be supplied to a nonsuitable battery. It should be noted that the positive contact 98 may be formed in a variety of configurations other than two upwardly extending areas so long as the contact has portions which engage against the positive terminal of a battery without contacting the nubbin or any protruding portion of the positive terminal 38.

It should be noted that although the insulative material jacket 46 has been illustrated as located a significant distance beneath the perimeter of the positive terminal 38 of the battery 36, the jacket may terminate at any level beneath that of the positive terminal planar base to obtain the advantages of the present invention. If desired, the insulative jacket 46 may even terminate immediately beneath the level of the planar base, to provide the maximum protection against shorting of the battery case side wall.

Figure 3:
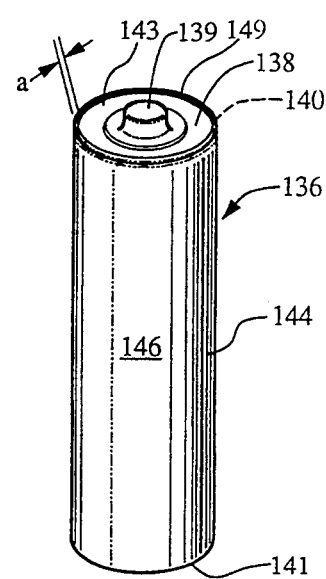
FIG. 3 is an isometric view of an alternative embodiment rechargeable battery of this invention.

An alternative battery 136 of the present invention is shown in FIG. 3. The battery 136 has a positive terminal 138 having an annular planar base 143 with a protruding nubbin 139. The battery 136 has a battery case 144 with a cylindrical side wall 142. An insulative jacket 146 extends between the positive terminal 138 and the negative terminal 141. To overcome the possibility in certain applications that the positive terminal perimeter 140 may short out against electrically conducting portions of the device in which the battery is used, the alternative battery 136 is provided with a positive terminal overlap portion 149 of the insulative label 146. However, the battery 136, having insulative portions 149 which extend above the positive terminal planar base 143, would not be charged in the charger 92 as face-to-face contact between a planar positive charger contact and the planar base 143 is prevented.

Figure 8:
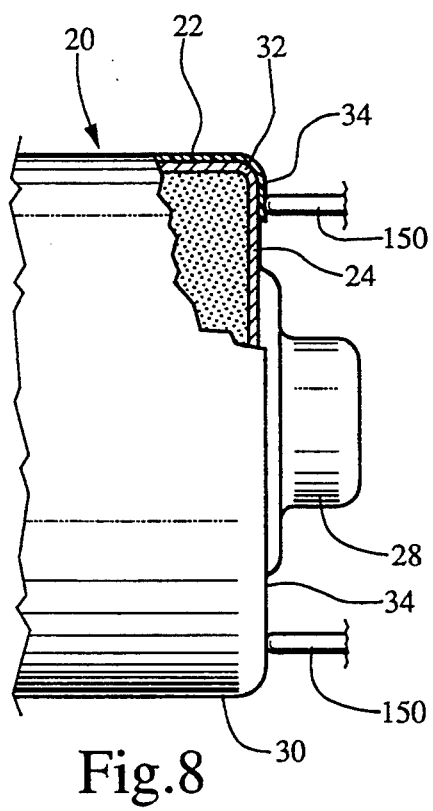
FIG. 8 is a side elevational view, partially broken away, of the prior art battery of FIG. 1 in nonelectrical engagement with the positive contacts of an alternative battery charger of the present invention.
Figure 9:
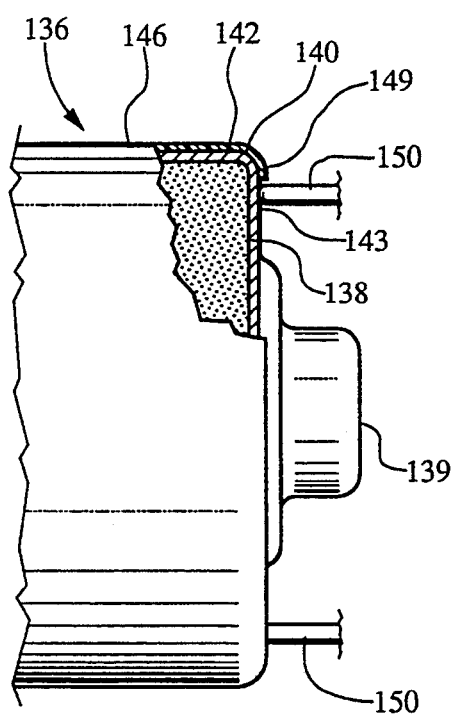
FIG. 9 is a side elevational view, partially broken away, of the battery of FIG. 3 in electrical engagement with the positive contact of the battery charger of FIG. 8.

To charge the battery 136 alternative positive contacts 150, shown in FIGS. 8 and 9, are required. The positive contacts 150 are protruding pins which are positioned within a charger housing such that the distance between the contact 150 and the outer diameter of the jacket 146 is less than that for any conventional battery. This distance may be measured approximately from an imaginary line extending from the perimeter 140. Referring to the data in Table 1, the width of the insulation positive terminal overlap 149 on the battery 136 must be less than 0.044 inches and preferably, to provide a margin of safety, less than 0.040 inches. As shown in FIG. 3, the width of the positive terminal overlap portion 149 is indicated as the dimension a, which is less than 0.040 inches. The region of the positive terminal radially outward of the region covered by insulation on a conventional battery is the battery charging locus for the battery 136.

As shown in FIG. 8, a conventional battery 20 placed in a charger equipped with the positive contacts 150 will interpose the prior art battery insulation overlap portion 34 between the positive terminal 24 and the positive contacts 150, due to the width of the insulation overlap portion being greater than 0.040 inches. The alternative battery 136, as shown in FIG. 9, will engage with the positive contacts 150 and will be successfully charged.

It should be noted that the battery and charger of this invention may be configured to suit any battery chemistry and compatible charger electronics.

It is understood that the invention is not confined to the particular construction and arrangement of parts herein illustrated and described, but embraces such modified forms thereof as come within the scope of the following claims.

I claim:
1. A battery comprising:
   a) a first end comprising an anode;
   b) a second opposing end comprising a cathode, said second end having a perimeter defining outer extremities thereof;
   c) a cylindrical connecting wall which extends between the first end and the second end; and
   d) electrically insulating material surrounding the connecting wall and projecting outwardly therefrom to form an electrically insulative barrier, wherein said second end is free from electrically insulating material at locations disposed inwardly and less than 40 thousandths of an inch from an imaginary line extending around said perimeter.
2. The battery of claim 1 wherein the battery is a rechargeable alkaline manganese battery.
3. A battery comprising:
   a) a first end comprising an anode terminal;
   b) a second opposing end comprising a cathode, said second end having an outer perimeter defining outer extremities thereof;
   c) connecting wall means between said first end to a location propinquant said second end; and
   d) an electrically insulating sleeve extending about said connecting wall means, said second end comprising uninsulated electrically conductive material being electrically connected to said cathode and being disposed at a location between zero thousandths of an inch to less than 40 thousandths of an inch from said perimeter.
4. The battery of claim 3 wherein the battery is a rechargeable alkaline manganese battery.
5. A battery charger, adapted to charge a battery having predetermined dimensions, and including a first end comprising an anode terminal and a second opposing end comprising a cathode terminal, the second end having an outer edge comprising an outer perimeter, and a charging contact locus electrically connected to the cathode terminal, the charging contact locus being disposed at a location between zero thousandths of an inch to less than 40 thousandths of an inch from the outer edge, said battery charger comprising:
   a) a charging circuit;
   b) a first charging contact for contacting the anode terminal of the battery;
   c) a second charging contact adapted to contact the charging contact locus on the second end of the battery at the location thereof between zero thousandths of an inch and less than 40 thousandths of an inch from the outer edge of the second end; and
   d) means for supporting the battery being charged.
6. A method of charging a battery comprising the steps of:
   a) inserting in a battery charger a battery having predetermined dimensions and including a first end comprising an anode terminal and a second opposing end comprising a cathode terminal, the second end having an outer edge comprising an outer perimeter, and a charging contact locus electrically connected to the cathode terminal, the charging contact locus being disposed at a location between zero thousandths of an inch and 40 thousandths of an inch from the outer edge, wherein the battery charger has a charging circuit, a first charging contact for contacting the anode terminal of said battery, a second charging contact adapted to contact the charging contact locus on the second end of the battery at the location thereof between zero thousandths of an inch and 40 thousandths of an inch from the outer edge of the second end of said battery, and means to support said battery, the battery being disposed between said first charging contact and said second charging contact; and
   b) energizing said charging circuit to provide electrical energy to said battery.
7. A battery charger adapted to recharge a battery having a negative terminal and a positive terminal with a planar base and a nubbin protruding therefrom, the charger comprising:
   a) a housing;
   b) a battery support connected to the housing;
   c) a negative contact positioned in proximity to the support and adapted to engage against and make electrical contact with the negative terminal of a rechargeable battery;
   d) a positive contact positioned in proximity to the support which engages against the planar base of the positive terminal of a rechargeable battery at a position spaced from the battery protruding nubbin, such that batteries having electrically insulative material overlying the planar base of the positive terminal will not be supplied with electric current, and a battery having no electrically insulative material overlying the planar base of its positive terminal will be charged.
8. The battery charger of claim 7 wherein the charger positive contact comprises:
   a) a base; and
   b) two arms which extend upwardly from the base, wherein each arm presents a frontwardly facing planar surface adapted to engage against a battery having predetermined dimensions and including a first end comprising an anode terminal and a second opposing end comprising a cathode terminal, the second end having an outer edge comprising an outer perimeter, and a charging contact locus electrically connected to the cathode terminal, the charging contact locus being disposed at a location between zero thousandths of an inch and 40 thousandths of an inch from the outer edge, the second end comprising a positive terminal with a planar base within the charging contact locus which engages with the two arms.
9. The battery charger of claim 7 wherein the charger positive contact comprises:
   a) a base;
   b) two arms which extend upwardly from the base, wherein each arm presents a frontwardly facing planar surface adapted to engage against the planar base of a rechargeable battery positive terminal, wherein each arm has a lower portion adapted for engagement with a battery of a first diameter and an upper portion which is wider than said lower portion for electrical engagement with a battery of a diameter larger than the first diameter.
10. A battery charging assembly comprising:
   a) a battery charger having a housing with portions adapted to support a rechargeable battery therein, a negative contact in proximity to the support portions, and a positive contact in proximity to the support portions, wherein the positive contact has a planar portion which faces the negative contact; and b) a rechargeable battery positioned on the housing support portions between the negative and positive contacts, the battery having a battery case and a negative terminal joined to the case and engaged against the charger negative contact and having a positive terminal with a planar base which engages against the charger positive contact planar portion in electrical contact, and an insulative covering encircles the battery case wherein the charger positive contact is configured such that if a battery with a protruding positive terminal nubbin is positioned on the support, no electrical contact will be made between the nubbin and the positive contact.

11. A rechargeable battery of standard dimensions, comprising:
    a) a positive terminal having a planar base and a nubbin which protrudes upwardly therefrom;
    b) a battery case extending beneath the positive terminal;
    c) a negative terminal terminating the bottom of the battery case and in electrically insulated relation to the positive terminal;
    d) an insulative material which surrounds the case and projects outwardly beyond the positive terminal to form an electrically insulative barrier, wherein the insulative material terminates beneath the level of the positive terminal planar base, such that the planar base is exposed above the insulative material for engagement by the contact of a battery charger.

12. The battery of claim 11 wherein the battery is a rechargeable alkaline manganese battery.

13. A battery comprising:
    a) a positive terminal having a planar base portion;
    b) a negative terminal opposite the positive terminal;
    c) a battery wall which extends between the positive and negative terminals and which does not electrically connect the terminals;
    d) an electrically insulative material which surrounds the battery wall and which extends over the positive terminal planar base a radial distance of less than 0.040 inches, wherein the battery is adapted to be charged by a battery charger having a positive contact which engages against the battery positive terminal base.

14. The battery of claim 7 further comprising a battery charger comprising:
    a) a housing;
    b) a battery support on the housing which supports the rechargeable battery; and
    c) a positive contact extending from the housing to engage the battery positive terminal base, wherein the positive terminal is positioned with respect to the support so as to engage the battery at a location less than 0.040 inches radially inward from the insulated battery wall.

* * * * *